Jan. 7, 1969   O. T. EDLUND ET AL   3,420,136
FASTENING MEANS
Filed Sept. 19, 1967   Sheet 1 of 2

INVENTOR.
OSCAR T. EDLUND
ROBERT G. WAGNER
BY
John Cyril Malloy
ATTORNEY.

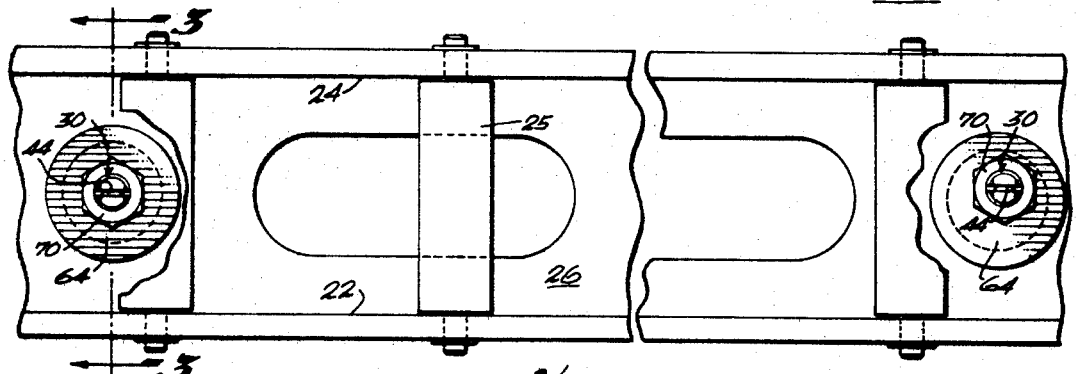
Fig. 2
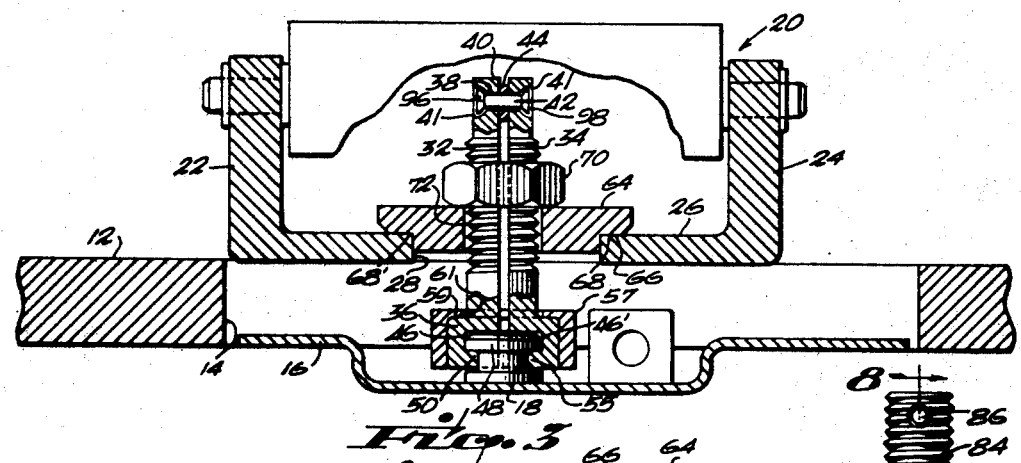
Fig. 3
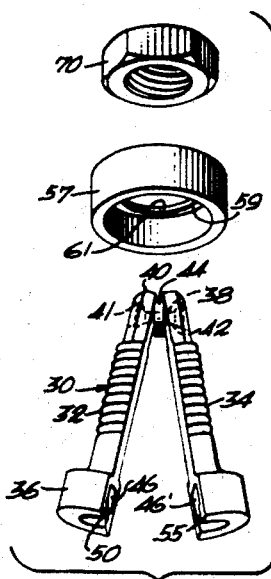
Fig. 4
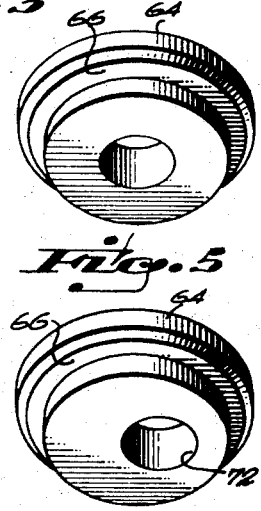
Fig. 5
Fig. 6
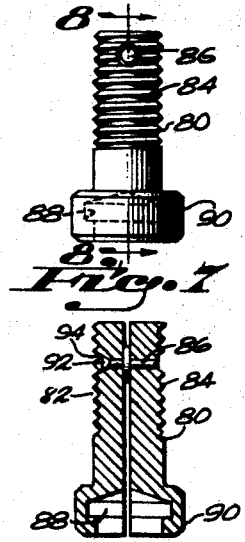
Fig. 7
Fig. 8
INVENTOR.
OSCAR T. EDLUND
ROBERT G. WAGNER
BY John Cyril Malloy
ATTORNEY.

United States Patent Office 3,420,136
Patented Jan. 7, 1969

3,420,136
FASTENING MEANS
Oscar T. Edlund, North Miami, and Robert G. Wagner, North Miami Beach, Fla., assignors to Jet Avion Corporation, Hialeah, Fla.
Filed Sept. 19, 1967, Ser. No. 668,901
U.S. Cl. 85—1          10 Claims
Int. Cl. F16b *35/00;* F16b *27/00*

ABSTRACT OF THE DISCLOSURE

For use in connecting channel form runners of a conveyor system to a headed floor stud, a fastening means which includes a screw split longitudinally of two equi-sized mirror portions with each portion having a recess in the head and with the head of the portions adapted to be diverged and thence clamped over the head of the stud to captivate the head of the stud in the recess in the screw head. A transverse pin extends through the shank end of the screw which extends through the web and spacer means are carried on the pin between the mirror image portions so that a clamp washer may be positioned on the screw and a nut threadably moved on the screw to tighten the channel form portion to the head of the floor stud.

---

This invention relates to a fastening means for securing the runners of a conveyor system to upstanding headed studs arranged in rows and columns in the floor of a transport van or aircraft at spaced intervals.

Because of production variations in such pattern of flooring, the relative position of the headed floor studs varies somewhat in that the same are not equi-spaced from one another in rows and, in addition, are not equi-spaced with respect to the other floor studs in column relation. Accordingly, it is difficult to secure runners of a conveyor system to the web on such floor studs when the webs are provided with spaced holes which are intended to register over an extension of the various floor studs. This invention has as an object the provision of an improved fastening means which is adjustable through the range required to compensate for the aforesaid production variations so that channel members may be installed quickly and efficiently and, when desired, removed and subsequently replaced without undue difficulty because of the aforesaid production variations.

It is, accordingly, an object of this invention to provide an improved fastening means which includes a headed split bolt assembly with an annular recess provided in the head and with the portions of the bolt being adapted to be separated for clamping over the head of the floor stud to captivate it in the recess and which includes a clamp washer adapted to be drawn against the web of a channel member to draw it to the floor stud on threaded travel of a bolt along the stem of the split bolt, and including spacer means between the extending ends of the split bolt to maintain the split bolt portions in screw form and a lateral pin extending through the split bolt portions and the spacer means to align the portions of the split bolt.

It is also an object of this invention to provide an improved fastening means as described hereinafter and referred to in the preceding paragraph wherein the clamp washer is provided with an eccentrically-disposed through hole whereby rotation of the clamp washer about the center line of the split bolt will effect adjustment through a range of 360 degrees and is adapted to compensate for production variations in the location of the floor stud with respect to the holes in the web.

It is also an object of this invention to provide the improved split bolt assembly of the type described which includes a reinforcing keeper ring to maintain the head of the split bolt in clamping engagement over the head of the floor stud to resist shear and tensional forces exerted by a load on the channel form runners of the conveyor system.

It is a further object of this invention to provide an improved fastening means of the type described wherein the aforesaid clamp washer is provided with a stepped surface to confront the web of the channel member to be secured to a floor and extend into a hole provided therein with the marginal surface of the web about the hole abutting the shoulder defined by the stepped surface.

It is also an object of this invention to provide an improved fastening means which is simple in construction, inexpensive to manufacture, and is adapted to be used for the application of the runners of a conveyor system provided with spaced, prefabricated through holes to a plurality of spaced, headed floor studs arranged in a pattern, said fastening means including adjustment means to compensate for variations in the pattern of the floor stud arising by reason of variations in production of the floor.

In accordance with these and other objects which will become apparent hereinafter, the instant invention will now be described with reference to the accompanying drawings in which:

FIGURE 2 is a partially broken away, plan view of a portion of a runner of a conveyor system secured to a floor stud by the split bolt assembly of the instant invention;

FIGURE 3 is a view in cross section taken along the plane indicated by the line 3—3 of FIGURE 2 and looking in the direction of the arrows;

FIGURE 4 is an exploded perspective view illustrating the split bolt assembly;

FIGURE 5 is a perspective view of the clamp washer included in the split bolt assembly;

FIGURE 6 is a view similar to FIGURE 5 and illustrating a modified clamp washer;

FIGURE 7 is an elevation view of a modified version of the split bolt seen in FIGURE 4; and FIGURE 8 is a view in cross section taken along the plane indicated by the line 8—8 of FIGURE 7 and looking in the direction of the arrows.

Figure 1:
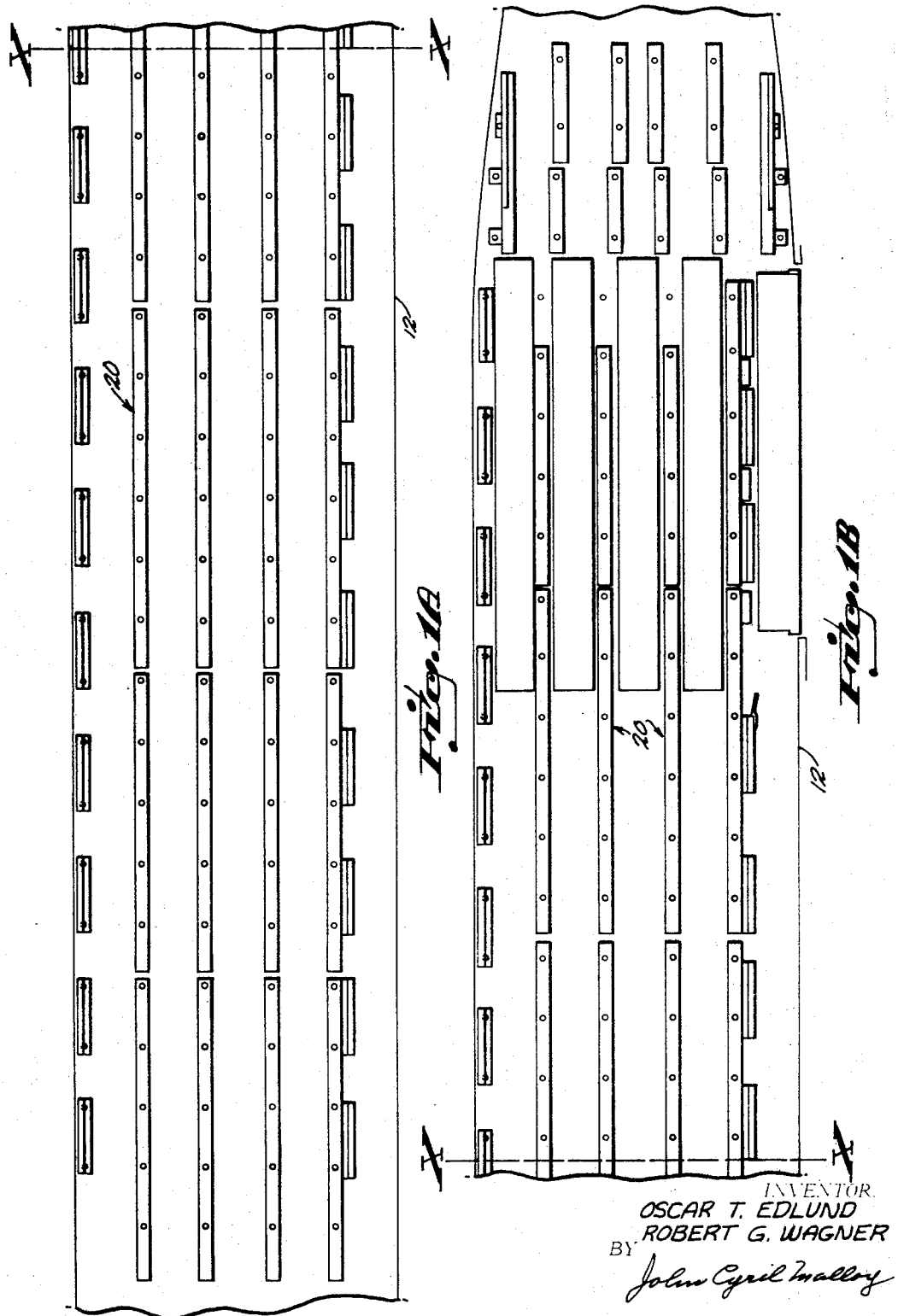
FIGURE 1A and FIGURE 1B are sections of a partial plan view of a surface provided with a pattern of headed floor studs and illustrating runners of a conveyor system secured thereover.

Referring to the drawings, wherein like reference characters designate like or corresponding parts throughout the different views, there is shown in FIGURES 1A and 1B a plan view of the flooring or deck 12 of an aircraft in which there are provided a series of rows of longitudinally- aligned recesses, such as that designated by the numeral 14 and seen in FIGURE 3. Each of the recesses 14 is provided with a sub-floor or pan 16 which includes an upstanding headed floor stud 18 for use in connecting a conveyor system of runners 20 along the floor. The runners are of channel form and defined by upstanding side rails 22, 24, or supports to be bridged by rollers 25, the supports being on opposite sides of a web 26 which extends along the floor spanning the recesses 14. The webs of the channel members are provided with lightening recesses and holes 28 spaced therealong for general registry of each of the holes above one of the floor stud members 18.

This invention is of a means for fastening the conveyor system to the flooring, that is, to the headed studs 18, and of an improved, split-bolt assembly to be described. In the past, because of production variances in the manufacture of the flooring or deck of an aircraft, the position of the headed studs have not always been found to be in perfect alignment or equi-spaced; consequently, the operation of anchoring the runners of the conveyor system to these headed studs has presented a problem of locating the holes 28 with respect to the predetermined position of the studs. For this reason a fastening means is required which is capable of minor adjustments to compensate for the variations within the limited range of adjustment required by the aforesaid production variances. This invention provides such a fastening means for installation of the conveyor system without time consuming and extensive modification of the channel runners or flooring. The fastening means include the split-screw structure which is seen clearly in FIGURE 4. It comprises a main threaded screw 30 which is slit longitudinally to define opposite portions 32 and 34. The screw is provided with a head 36 and a lateral hole 38 adjacent the opposite end 40 with this lateral hole being counterbored at each end thereof as at 41 to accommodate a lateral pin 42 which passes through a spacer 44 of the same size thickness as the maximum diametrical thickness of the removed metal caused by the longitudinal slitting of the screw 30. It will be seen that by reason of this structure the screw portions 32 and 34 are adapted to be separated or diverged to provide for clamping of the head end 36 over the head 48 of the floor stud, the portions being provided with an enlarged recess 46 and 46' in the aforesaid clamping action, there being a retaining lip 50 and 55 defined above the recess to close the same.

In installing the conveyor, the screw is separated and fastened to the head 48 of the study 18 in the manner indicated in FIGURE 3 by bringing the portions together to define the recess for receiving the head of the floor stud. In the preferred embodiment, a keeper ring 57 is provided to assist in taking up the shear or tension forces exerted. The keeper ring includes a floor 59 with an axial through hole 61 to define a seat or shoulder so that on passage of the keeper along the length of the screw, the screw head will nest within the seat and be reinforced thereby with the ring holding the screw head in the position shown in FIGURE 3 until the clamping action now to be described is applied. The length of the screw is sufficient so as to extend through the hole 28 in the web 26 of the conveyor strip or runner and over this distal end an enlarged washer 64 is passed into a position where the surface bears against the web. The washer 64 is provided with a stepped and beveled edge providing the shoulder 66 to dwell on the corners indicated by the arrowed line 68 and 68' of the hole 28. The washer in turn is held in place by a lock nut 70 which draws the washer and, consequently, the runner of the conveyor snugly to the floor. Referring to FIGURES 5 and 6 it will be seen that the opening 72 in the washer may be either in the center or in an eccentric position as indicated by the numeral 72'. It will be seen that by reason of this structure the aforesaid production variations in the location of the heads of the floor studs relative to the spaced position of the holes 28 may be compensated for by merely rotating the washer 64, if it is eccentric, until it assumes the position of nesting shown in FIGURE 3, i.e., on the lip or corner 68 of the hole in the web.

Referring to FIGURES 7 and 8, it will be seen that a somewhat modified version of this invention is provided with the bolt 80 comprising two portions 82 and 84 which are separable about a transverse pin 86 so as to open and close a pocket 88 formed in the head 90 thereof, the said modified version being for use in the manner previously described. It will be noted that the head 92 of the pin 86 is snugly seated within the counterboard, lateral hole 94 whereas in the embodiment shown in FIGURE 3, the heads 96 and 98 of the pin 42 are loosely captivated within the counterbore 41. In either embodiment, the pocket or recess may be opened or closed for clamping engagement, in the first embodiment the bolt portion or screw portion being held and maintained together and capable of divergence for the clamping action while in the second embodiment the bolts are separable into two distinct units.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. For use in attaching a channel form conveyor system runner having a hole in the web to the head of a floor stud, comprising, a fastening means including, in combination, a longitudinally split bolt comprising a first and a second equi-sized mirror image member, each member having a shank portion and a headed portion, said shank portions being threaded and said head portions having a lateral recess intermediate the shank portion and the terminal end of the head portion defining an annular pocket sized to snugly nest over the head of the floor stud when the threads of the members are circular with respect to the center line of the bolt as seen in lateral cross-section, each of said members having a transverse hole through the shank equi-spaced from the shank end and defining a through passageway;

a transverse pin loosely receivable in said aligned holes;

spacer means on said pin between said members, said spacer means having a maximum thickness in the direction of the axis of the passageway such that when the head portions are in said pocket-defining relation, the threads of the shank portion define a helical path along the shank and the head portions may be diverged for passage over the head of the stud, said split bolt being of a length sufficient to extend through the hole in the runner when the head of the floor stud is in said pocket;

a clamp washer with a hole sized for passage over the shank portions of the members and of a diameter larger than the hole in the conveyor web, and a lock nut for threaded travel on the stem to clamp the washer to the web of the runner when the stud head is in the pocket.

2. The device as set forth in claim 1 wherein a keeper ring is provided, said keeper ring having a floor with a hole sized for passage of the shank portions and said ring having an inside diameter sized to nest about said headed portions to resist shear and tensional forces and to retain the stud in pocket-defining relation while the lock nut is threadably traveled to move the lock washer into clamping engagement with the web of the runner.

3. The improvement as set forth in claim 2 wherein the hole in said clamp washer is eccentric with respect to the central axis of the washer, whereby the location of the maximum radial displacement of the periphery of the clamp washer may be varied as seen in plan through 360 degrees.

4. The device as set forth in claim 3 wherein the clamp washer is provided with an enlarged portion of a first diameter and a smaller portion of a second diameter defining an integral body of disk-shaped portions, with the peripheral surface of the disk-shaped portion of reduced diameter comprising a leading wall and the face of the disk-shaped portion of the enlarged diameter facing in the direction of the smaller portion comprising a clamping face with a shoulder being defined therebetween, said smaller disk-shaped portion being sized for entrance into the hole in the web of the channel form runner with the clamping surface abutting the margin of the web about the hole.

5. The improvement as set forth in claim 1 wherein the hole in said clamp washer is eccentric with respect to the central axis of the washer, whereby the location of the maximum radial displacement of the periphery of the clamp washer may be varied as seen in plan through 360 degrees.

6. The device as set forth in claim 5 wherein the clamp washer is provided with an enlarged portion of a first diameter and a smaller portion of a second diameter defining an integral body of disk-shaped portions, with the peripheral surface of the disk-shaped portion of reduced diameter comprising a leading wall and the face of the disk-shaped portion of the enlarged diameter facing in the direction of the smaller portion comprising a clamping face with a shoulder being defined therebetween, said smaller disk-shaped portion being sized for entrance into the hole in the web of the channel form runner with the clamping surface abutting the margin of the web about the hole.

7. The device as set forth in claim 1 wherein said transverse pin is provided with opposite headed ends having an outward taper and the aligned holes in the members are countersunk on the exterior surfaces of the split bolt defining a seat larger than the headed ends of the pin, the headed ends of the pin maintaining the pin captivated in said holes to hold the members together with the spacer captivated on the pin so that the headed portion may be diverged for clamping engagement of the head portions of the members over the floor stud head.

8. The device as set forth in claim 1 wherein said pin is provided with a head and one of said aligned holes is countersunk.

9. For use in attaching a channel form conveyor system runner having a hole in the web to the head of a floor stud, comprising, a fastening means including, in combination,
- a longitudinally split bolt comprising a first and a second equi-sized mirror image member, each member having a shank portion and a headed portion, said shank portions being threaded and said head portions having a lateral recess intermediate the shank portion and the terminal end of the head portion defining an annular pocket sized to snugly nest over the head of the floor stud when the threads of the members are circular with respect to the center line of the bolt as seen in lateral cross-section, each of said members having a transverse hole through the shank equi-spaced from the shank end and defining a through passageway;
- a transverse pin loosely receivable in said aligned holes;
- spaced means on said pin between said members, said spacer means having a maximum thickness in the direction of the axis of the passageway such that when the head portions are in said pocket-defining relation, the threads of the shank portion define a helical path along the shank and the head portions may be diverged for passage over the head of the stud,
- said split bolt being of a length sufficient to extend through the hole in the runner when the head of the floor stud is in said pocket;
- a lock nut for threaded travel on the stem to clamp the web between the lock nut and the head of the floor stud; and
- a keeper ring having a floor with a hole sized to nest about the headed portions to resist shear and tensional forces and to retain the stud in pocket-defining relation while the lock nut is threadably traveled to clamp the web of the runner to the floor stud.

10. The device as set forth in claim 9 wherein the transverse pin is provided with a headed end to limit movement of the mirror image members toward one another.

References Cited

UNITED STATES PATENTS

| | | |
|---|---|---|
| 938,662 | 11/1909 | Graham. |
| 2,897,777 | 2/1933 | Volckening. |
| 2,982,387 | 2/1961 | Hinckley _____ 193—35 |
| 3,006,443 | 10/1961 | Siler _____ 85—1 |

FOREIGN PATENTS 1,189,915  3/1965  Germany.

EDWARD C. ALLEN, *Primary Examiner.*

U.S. Cl. X.R.

193—35